(12) United States Patent
Nakao et al.

(10) Patent No.: US 10,972,625 B2
(45) Date of Patent: Apr. 6, 2021

(54) OPTICAL SCANNING DEVICE AND IMAGE FORMING APPARATUS

(71) Applicant: SHARP KABUSHIKI KAISHA, Sakai (JP)

(72) Inventors: Atsuo Nakao, Sakai (JP); Reishi Aoki, Sakai (JP); Takaharu Motoyama, Sakai (JP); Hiroshi Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/840,211

(22) Filed: Apr. 3, 2020

(65) Prior Publication Data

US 2020/0336619 A1    Oct. 22, 2020

(30) Foreign Application Priority Data

Apr. 18, 2019   (JP) .............................. JP2019-079073

(51) Int. Cl.
*H04N 1/04*    (2006.01)
*H04N 1/113*   (2006.01)

(52) U.S. Cl.
CPC .................................. *H04N 1/113* (2013.01)

(58) Field of Classification Search
CPC ...... H04N 1/113; H04N 1/193; H04N 1/1017; H04N 1/1013; H04N 1/12; H04N 2201/00849
USPC .................................................. 358/474, 1.1
See application file for complete search history.

(56) References Cited

U.S. PATENT DOCUMENTS

| | | | |
|---|---|---|---|
| 2007/0279707 A1* | 12/2007 | Yamaguchi ............ | H04N 1/024 358/484 |
| 2008/0068678 A1* | 3/2008 | Suzuki ................... | H04N 1/053 358/481 |
| 2010/0046046 A1* | 2/2010 | Tomioka .............. | G03G 15/326 358/475 |
| 2012/0002260 A1* | 1/2012 | Tomioka .................. | B41J 2/473 359/201.1 |

FOREIGN PATENT DOCUMENTS

JP        2015-155939 A    8/2015

* cited by examiner

*Primary Examiner* — Douglas Q Tran
(74) *Attorney, Agent, or Firm* — ScienBiziP, P.C.

(57) ABSTRACT

To provide an optical scanning device including a lower housing including an opened upper part, an upper housing that covers the upper part of the lower housing, and an fθ lens on which a beam reflected by a rotating polygon mirror is incident. The lower housing includes a raised area being raised upward from a lower housing bottom surface. The fθ lens is mounted to face a bottom side of the raised area.

11 Claims, 13 Drawing Sheets

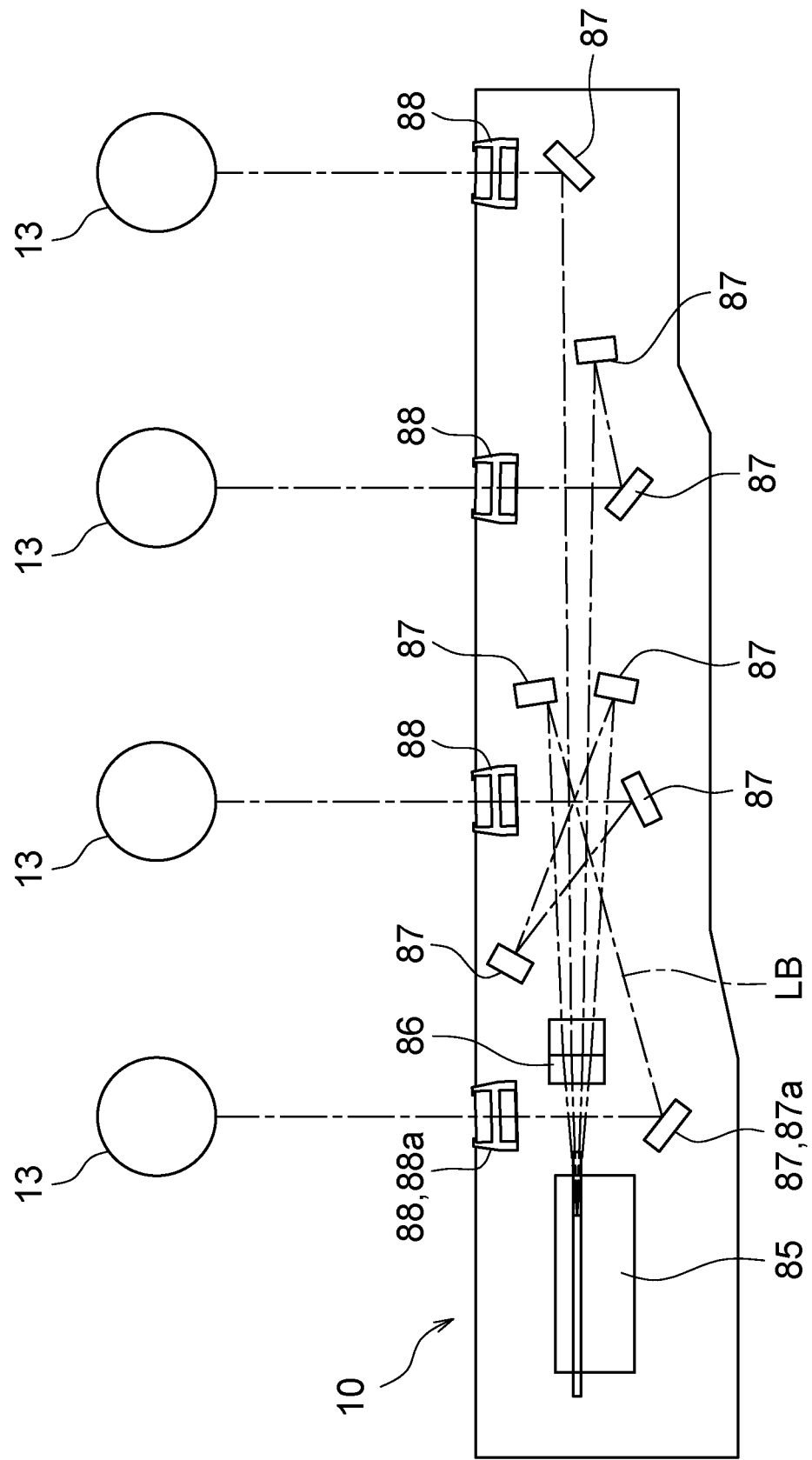

OPTICAL SCANNING DEVICE AND IMAGE FORMING APPARATUS

BACKGROUND OF THE INVENTION

Field of the Invention

The present invention relates to an optical scanning device for scanning an object to be scanned with a beam and an image forming apparatus therefor.

Description of the Background Art

In an image forming apparatus including a plurality of photoreceptors and an intermediate transfer belt, for example, in a tandem-type multicolor image forming apparatus, a toner image formed on each of the photoreceptors is sequentially transferred (primarily transferred) on the rotating intermediate transfer belt from an upstream side to a downstream side. The photoreceptor is scanned with a beam by using an optical scanning device to form an electrostatic latent image on a surface of the photoreceptor, and the image is developed with toner to form a toner image.

In the optical scanning device, a lens, a mirror, and the like are arranged in a housing, and a beam is folded back to set an optical path on which the beam is not obstructed. Further, a positional displacement of the lens or the mirror and the like may lead to a failure when toner images are superimposed, and thus, a method for preventing such a failure has been proposed (see, for example, Japanese Unexamined Patent Application Publication No. 2015-155939, hereinafter, referred to as Patent Document 1).

The optical scanning device described in Patent Document 1 includes a light emitting element that emits a beam, a deflector that deflects the beam, and a housing including an image-forming optical system that guides the beam to an object to be scanned, and an fθ lens of the image-forming optical system is fixed to the housing. In the above-described optical scanning device, a protrusion or the like provided on the fθ lens is inserted from above into a hole or the like provided in the housing to fix the fθ lens to the housing. In a space below the fθ lens, the housing that blocks the beam is provided, and thus, the space is not considered as an optical path for the beam.

The present invention has been made to resolve the above problems, and an object thereof is to provide: an optical scanning device in which it is possible to decrease the thickness of the housing while securing the strength of an attachment device of the fθ lens; and an image forming apparatus therefor.

SUMMARY OF THE INVENTION

An optical scanning device according to the present invention is an optical scanning device for scanning an object to be scanned with a beam. The optical scanning device includes a light source that emits a beam, a rotating polygon mirror that reflects the beam emitted from the light source, an fθ lens on which the beam reflected by the rotating polygon mirror is incident, and a reflection mirror that guides the beam emitted from the fθ lens to an object to be scanned, in which a housing is configured by a lower housing including an opened upper part and an upper housing that covers the upper part of the lower housing, the lower housing includes a raised area being raised upward from a bottom surface of the lower housing, and the fθ lens is mounted to face a bottom side of the raised area.

In the optical scanning device according to the present invention, it may be configured such that the lower housing includes a coupler that couples the bottom surface and the raised area.

In the optical scanning device according to the present invention, it may be configured such that the coupler is located between the fθ lens and a reflection mirror on which a beam emitted from the fθ lens is first incident, on an optical path of the beam, and the beam passes through a coupling opening provided in the coupler.

In the optical scanning device according to the present invention, it may be configured such that the raised area includes a holder extending downward, and the holder holds a lower part of the fθ lens.

In the optical scanning device according to the present invention, it may be configured such that the fθ lens is held on the holder by a plate spring and a screw.

In the optical scanning device according to the present invention, it may be configured such that the raised area includes a component fixer extending downward, and an optical component arranged on the optical path of the beam is fixed to the component fixer.

In the optical scanning device according to the present invention, it may be configured such that the lower housing is provided with lead-out openings at a position overlapping with the bottom surface opening in a sub scanning direction along a beam passing through the fθ lens, and on both sides sandwiching the raised area.

In the optical scanning device according to the present invention, it may be configured such that one of the lead-out openings is provided between the rotating polygon mirror and the fθ lens to provide a folded opening that guides a beam reflected by the reflection mirror to the object to be scanned.

In the optical scanning device according to the present invention, it may be configured such that the other of the lead-out openings is provided between the fθ lens and the reflection mirror to provide a coupling opening that guides a beam passing through the fθ lens to the reflection mirror.

In the optical scanning device according to the present invention, it may be configured such that the coupling opening includes an upper coupling opening and a lower coupling opening, and a width of the upper coupling opening is smaller than a width of the lower coupling opening in a main scanning direction in which scanning with a beam is performed by the rotating polygon mirror.

An image forming apparatus according to the present invention includes the optical scanning device according to the present invention.

According to the present invention, the fH lens is suspended below the raised area, and thus, it is possible to decrease the thickness of the housing while securing the strength of the attachment device of the fθ lens arranged above.

BRIEF DESCRIPTION OF THE DRAWINGS

FIG. 13 is an explanatory side view illustrating the optical path of the beam in the optical scanning device.

DESCRIPTION OF THE PREFERRED EMBODIMENTS

An image forming apparatus according to an embodiment of the present invention will be described below with reference to the drawings.

Figure 1:
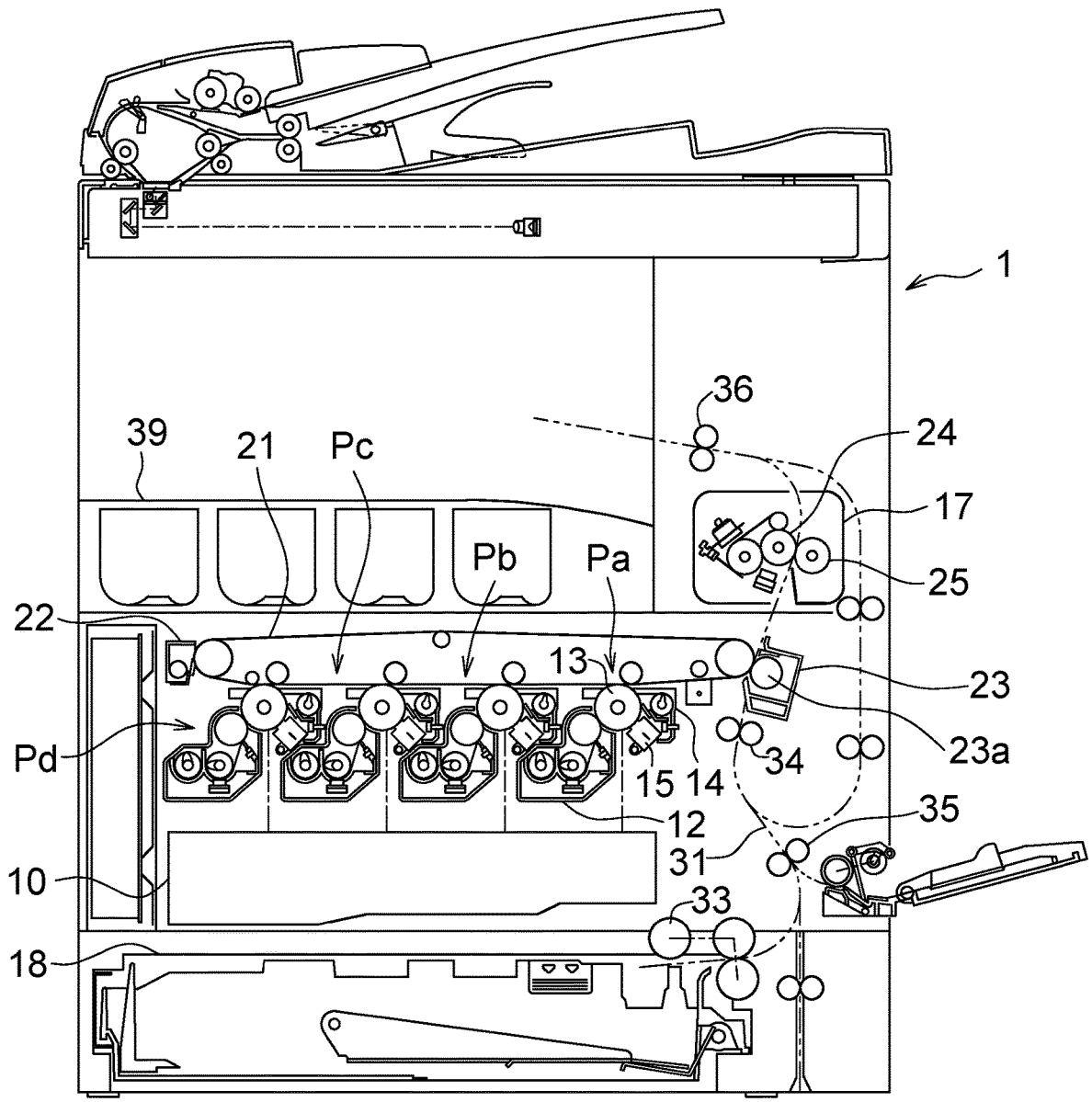
FIG. 1 is a schematic side view illustrating an image forming apparatus according to an embodiment of the present invention.

FIG. 1 is a schematic side view illustrating the image forming apparatus according to the embodiment of the present invention.

In an image forming apparatus 1, which is a multifunctional apparatus having a scanner function, a copying function, a printer function, and a facsimile function, an image of a document read by an image reader provided on an upper part of the image forming apparatus 1 is transmitted to outside (which corresponds to the scanner function), and the image of the read document or an image received from outside is formed onto a sheet in color or in a single color (which corresponds to the copying function, the printer function, and the facsimile function).

An automatic document feeder (ADF) supported to be openable and closable with respect to the image reader is arranged above the image reader. The automatic document feeder automatically transports a placed document onto the image reader. The image reader reads the document transported from the automatic document feeder to generate image data.

The image forming apparatus 1 includes an optical scanning device 10, a developing device 12, a photosensitive drum 13, a drum cleaning device 14, a charger 15, an intermediate transfer belt 21, a fixing device 17, a sheet transport path 31, a paper feed cassette 18, and a loading tray 39.

In the image forming apparatus 1, image data corresponding to a color image in which each color of black (K), cyan (C), magenta (M), and yellow (Y) is used, or a monochrome image in which a single color (for example, black) is used is processed. In the image forming apparatus 1, the developing device 12 includes four developing devices 12, the photosensitive drum 13 includes four photosensitive drums 13, the drum cleaning device 14 includes four drum cleaning devices 14, and the charger 15 includes four chargers 15, to form four types of toner images, and each of the developing devices 12, the photosensitive drums 13, the drum cleaning devices 14, and the chargers 15 is associated with black, cyan, magenta, and yellow to configure four image stations Pa, Pb, Pc, and Pd.

The drum cleaning device 14 removes and collects residual toner from the surface of the photosensitive drum 13. The charger 15 uniformly charges the surface of the photosensitive drum 13 to be a predetermined potential. The optical scanning device 10 exposes a surface of the photosensitive drum 13 to form an electrostatic latent image. The developing device 12 develops the electrostatic latent image on the surface of the photosensitive drum 13 to form a toner image on the surface of the photosensitive drum 13. A toner image having each of the colors is formed on the surface of each of the photosensitive drums 13 through the above-described series of operation. A detailed structure of the optical scanning device 10 will be described with reference to FIG. 2 and FIG. 3 described later.

The intermediate transfer belt 21 moves in circulation, residual toner is removed and collected by a belt cleaning device 22, the toner image having each of the colors formed on the surface of each of the photosensitive drums 13 is sequentially transferred and overlapped, and as a result, a color toner image is formed on the surface of the intermediate transfer belt 21.

A nip area is formed between a transfer roller 23a of a secondary transfer device 23 and the intermediate transfer belt 21, and a sheet transferred along the sheet transport path 31 is sandwiched in the nip area for transfer. When the sheet passes through the nip area, the toner image on the surface of the intermediate transfer belt 21 is transferred, and then the sheet is transported to the fixing device 17.

The fixing device 17 includes a fixing roller 24 and a pressure roller 25 that rotate with a sheet being sandwiched therebetween. The fixing device 17 sandwiches, between the fixing roller 24 and the pressure roller 25, the sheet onto which the toner image is transferred, and heats and presses the sheet to fix the toner image on the sheet.

The paper feed cassette 18 is a cassette that stacks a sheet used for image formation, and is arranged below the optical scanning device 10. The sheet is pulled out from the paper feed cassette 18 by a sheet pickup roller 33, is transported through the sheet transport path 31, passes through the secondary transfer device 23 and the fixing device 17, and is discharged to the loading tray 39 through a sheet discharge roller 36. There are arranged a sheet resist roller 34 that halts the transport of sheets, aligns edges of the sheets, and then, resumes the transport of the sheet in synchronization with a transfer timing of the color toner image in the nip area between the intermediate transfer belt 21 and the transfer roller 23a, a sheet transport roller 35 that prompts the transport of the sheets, and the sheet discharge roller 36, in the sheet transport path 31.

Further, the image forming apparatus 1 is configured to form an image not only on a top side of the sheet but also on a bottom side thereof, and is provided with a path for transporting the sheet from the sheet discharge roller 36 in a reverse direction. The sheet is again guided, while being turned upside down, to the sheet resist roller 34, the image is formed on the bottom side as on the top side, and thereafter, the sheet is transported onto the loading tray 39.

Figure 2:
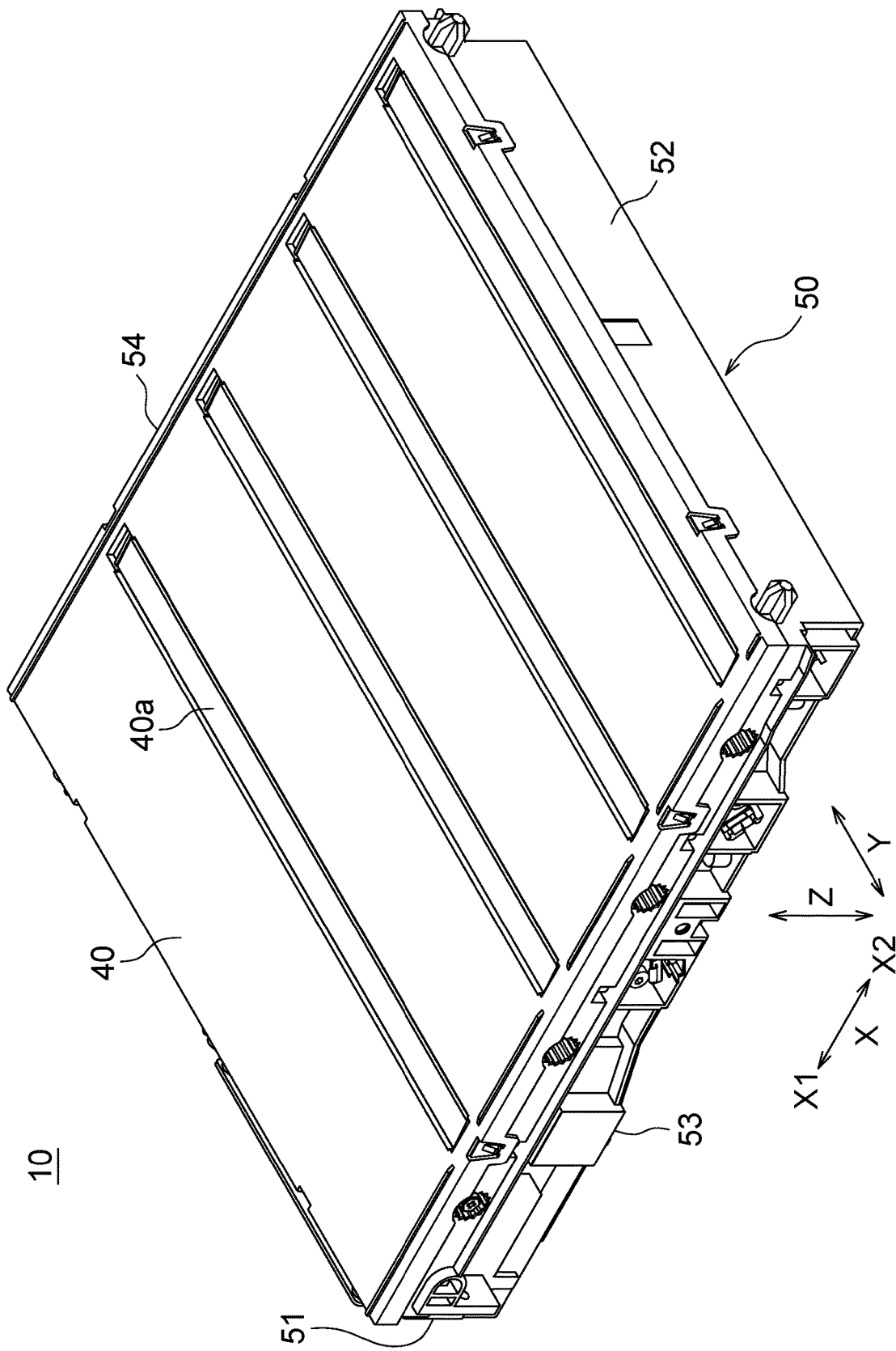
FIG. 2 is an external perspective view illustrating an optical scanning device viewed from above.
Figure 3:
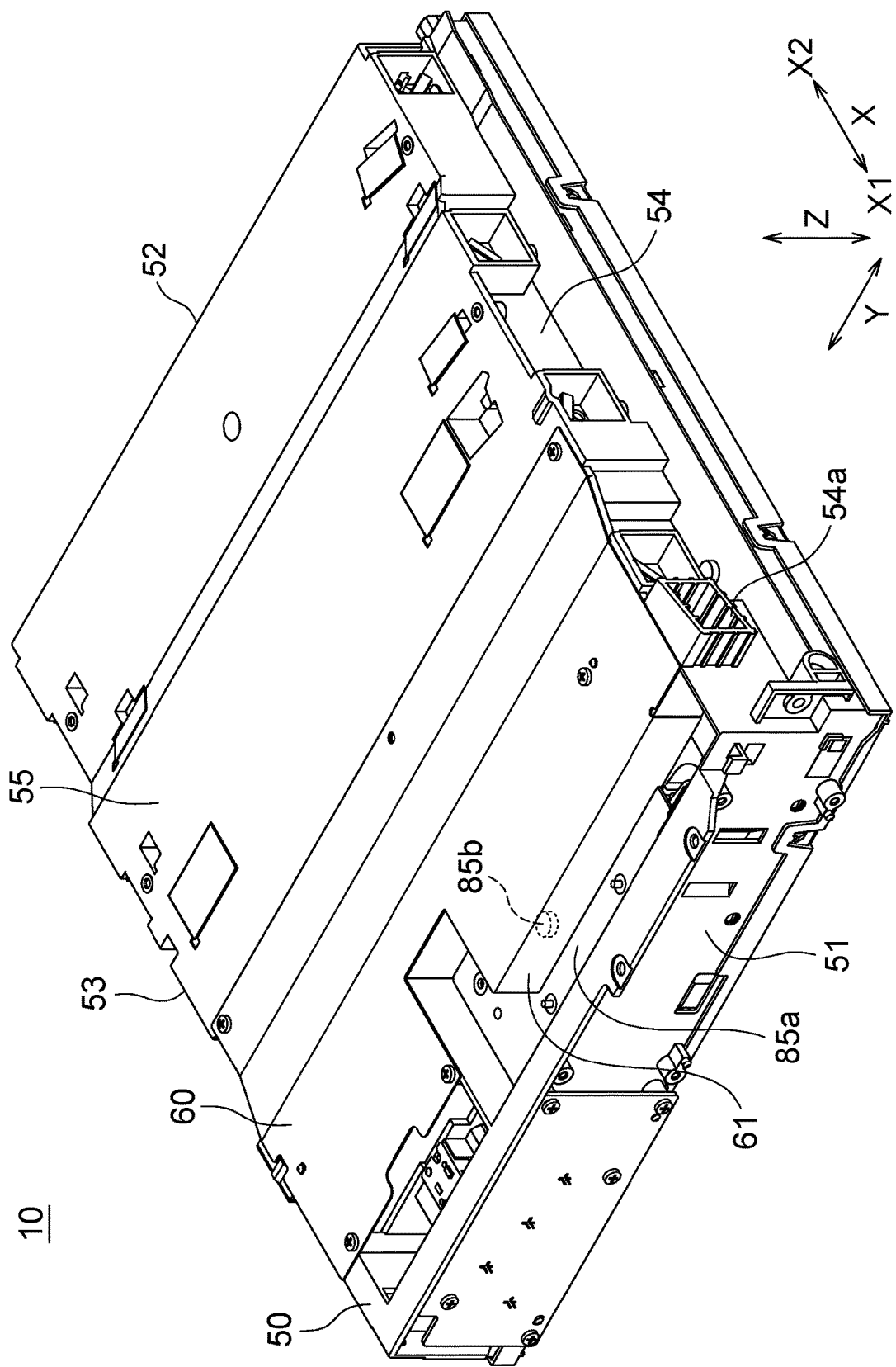
FIG. 3 is an external perspective view illustrating the optical scanning device viewed from below.

FIG. 2 is an external perspective view illustrating the optical scanning device 10 viewed from above, and FIG. 3 is an external perspective view illustrating the optical scanning device 10 viewed from below.

A housing of the optical scanning device 10 according to the embodiment of the present invention includes a lower housing 50 including an opened top part and an upper housing 40 that covers the top part of the lower housing 50. The housing of the optical scanning device 10 has a substantially rectangular thin parallelepiped shape.

The upper housing 40 is substantially entirely formed of an opaque material, has a partially opened upper surface, and is provided with an emission window 40a formed of a transparent material to cover the opened portion. The emission window 40a has a long rectangular shape as viewed from above, and has a longer length so that an end of the emission window 40a nearly reaches an outer edge of the upper housing 40. The emission window 40a includes four emission windows 40a to correspond to the four photosensitive drums 13, and the four emission windows 40a are spaced apart from each other in a shorter direction of the emission window 40a. In the description below, the shorter direction of the emission window 40a may be referred to as "sub scanning direction X", and the longer direction of the emission window 40a may be referred to as "main scanning direction Y".

The lower housing 50 is a container that contains optical components therein, and has a side wall provided along an outer periphery of a lower housing bottom surface 55. In the side wall of the lower housing 50, a lower housing first side wall 51 and a lower housing second side wall 52 are opposite to each other in the sub scanning direction X, and a lower housing third side wall 53 and a lower housing fourth side wall 54 are opposite to each other in the main scanning direction Y. In the following description, for the sake of explanation, out of the sub scanning direction X, a side on which the lower housing first side wall 51 is provided may be referred to as "first sub scanning direction X1", and a side on which the lower housing second side wall 52 is provided may be referred to as "second sub scanning direction X2".

The lower housing bottom surface 55 includes a bottom surface opening 56 (for example, FIG. 7) being partially opened, and a metal bottom plate member 60 is mounted by using a screw or the like to cover the bottom surface opening 56. A malt formed of a sponge or the like may be attached to a portion of the bottom plate member 60 where the bottom plate member 60 contacts the lower housing 50 to improve the sealability. A positional relationship between the bottom surface opening 56 and the bottom plate member 60 will be described with reference to FIG. 8.

Next, an internal structure of the lower housing 50 will be described with reference to FIG. 4 to FIG. 8.

Figure 4:
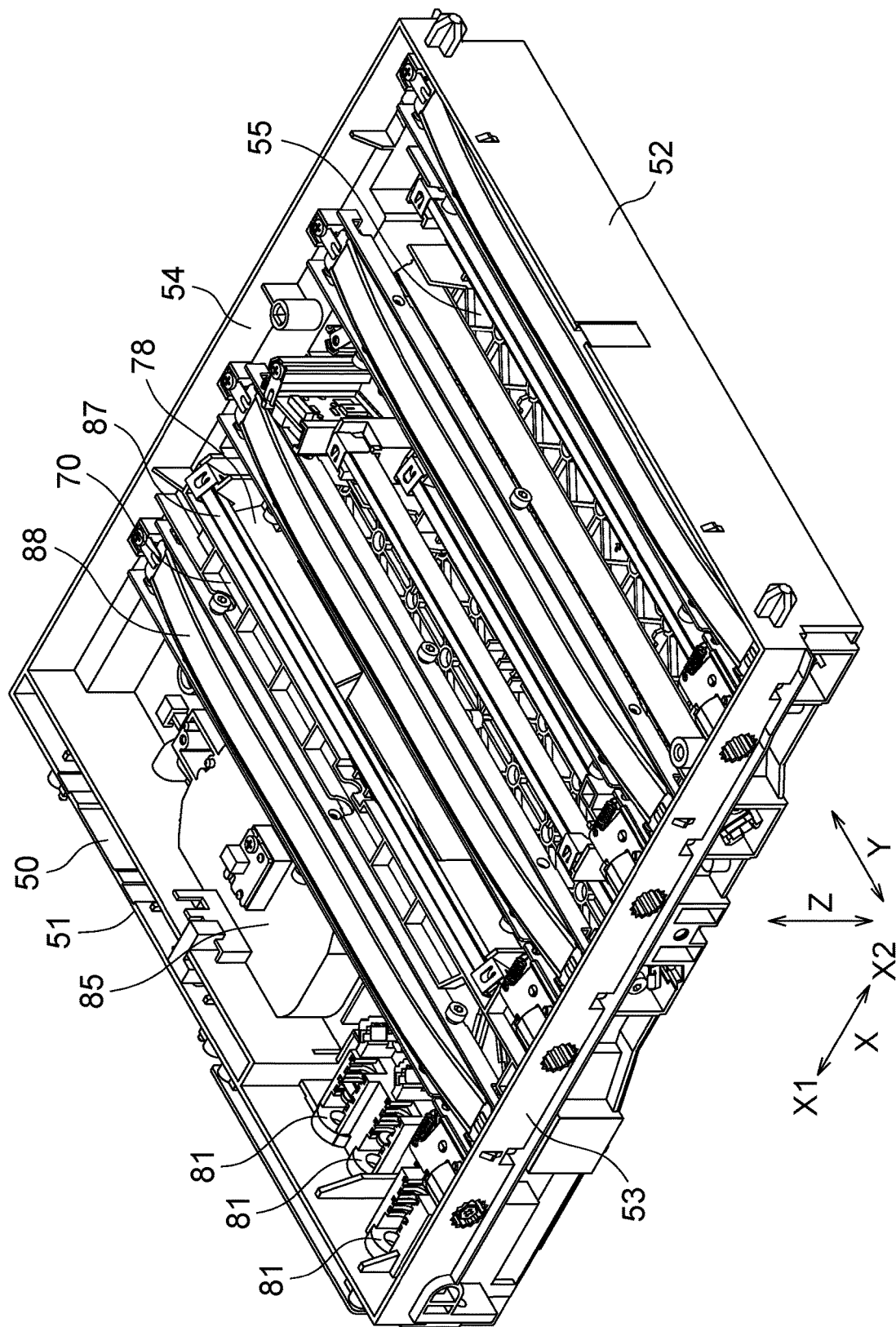
FIG. 4 is an external perspective view illustrating a state where a lower housing from which an upper housing is removed is viewed from above.
Figure 5:
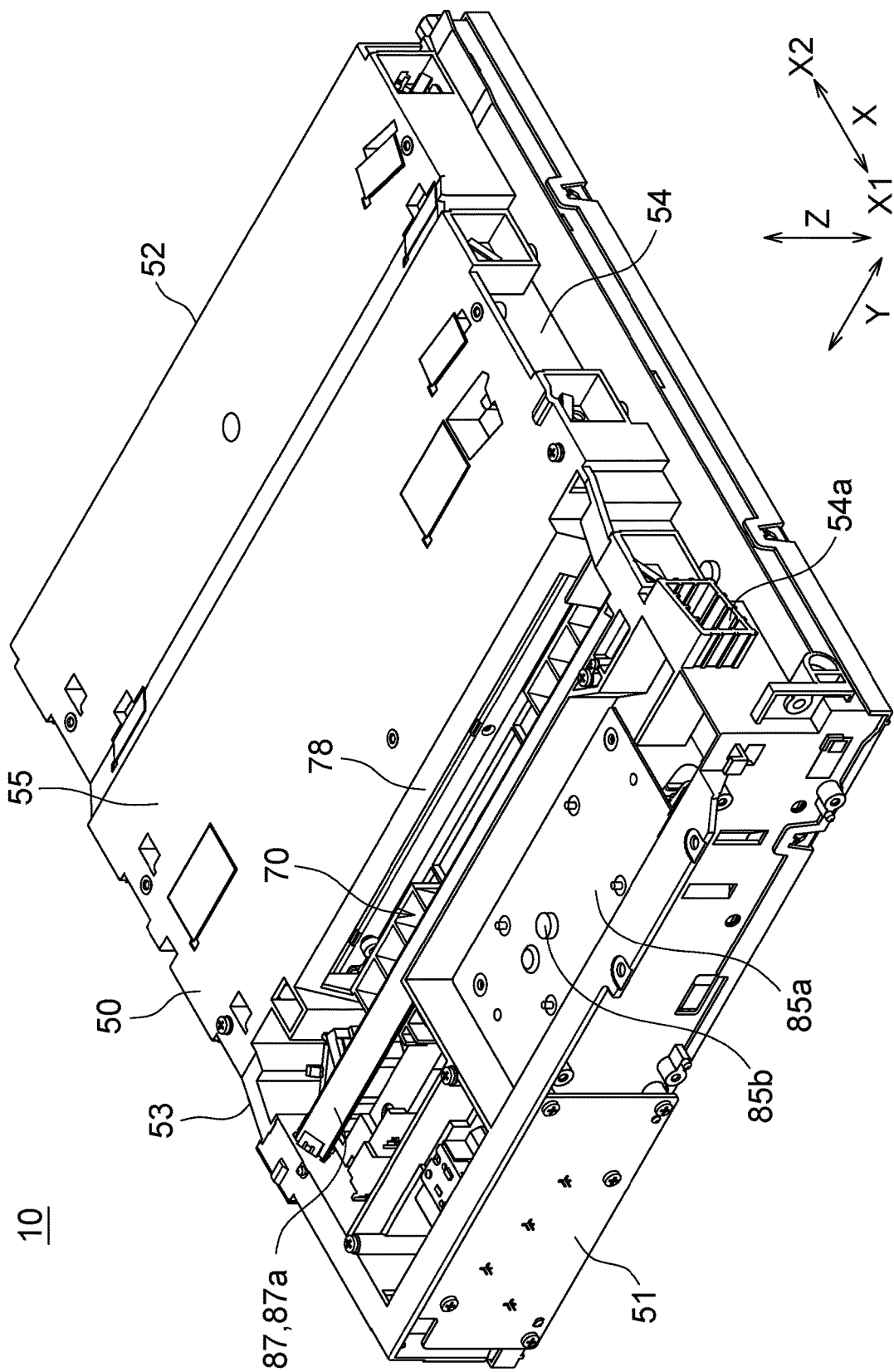
FIG. 5 is an external perspective view illustrating a state where the lower housing from which a bottom plate member is removed is viewed from above.
Figure 6:
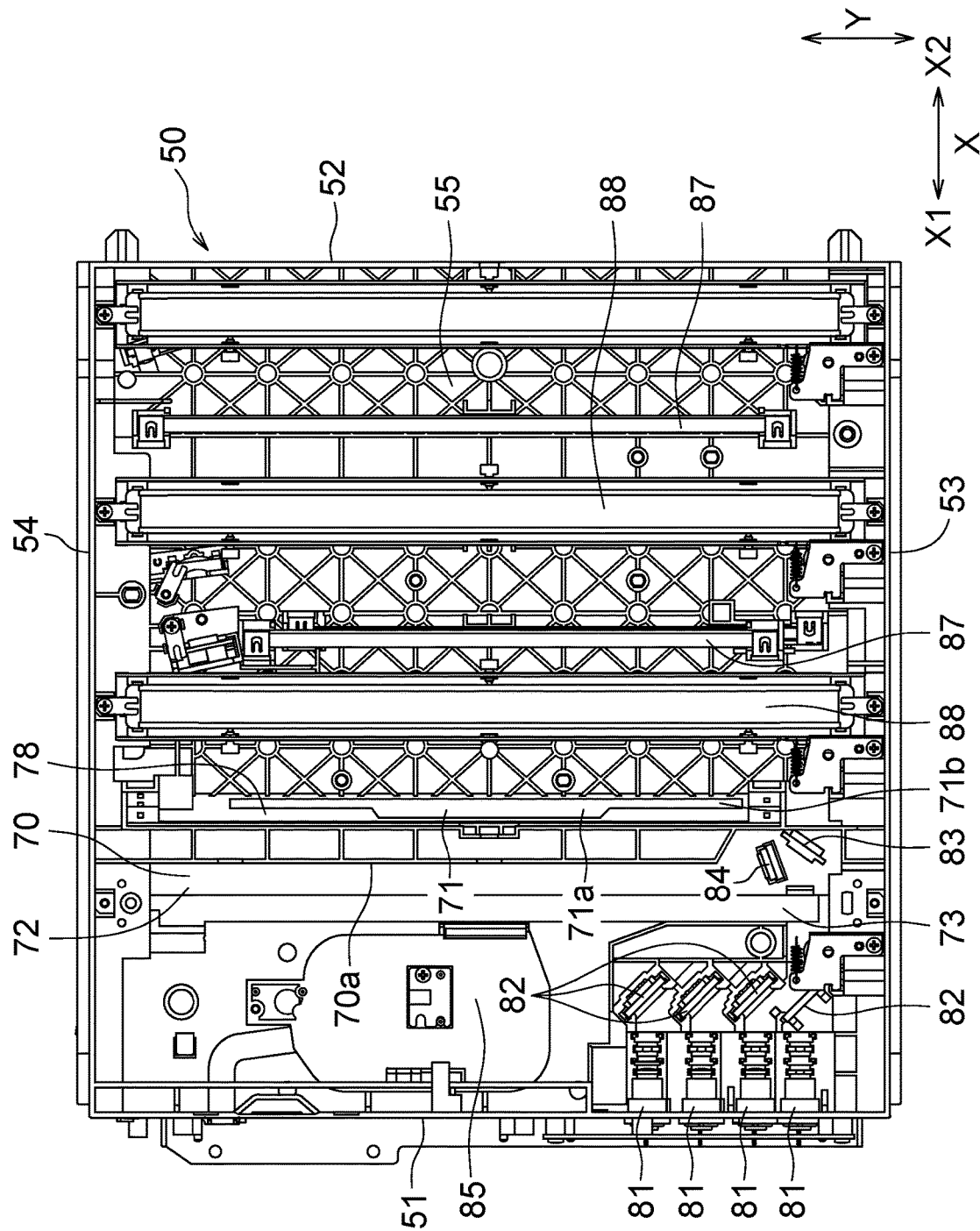
FIG. 6 is an external plan view illustrating a state where the lower housing from which the upper housing and the bottom plate member are removed is viewed from above.
Figure 7:
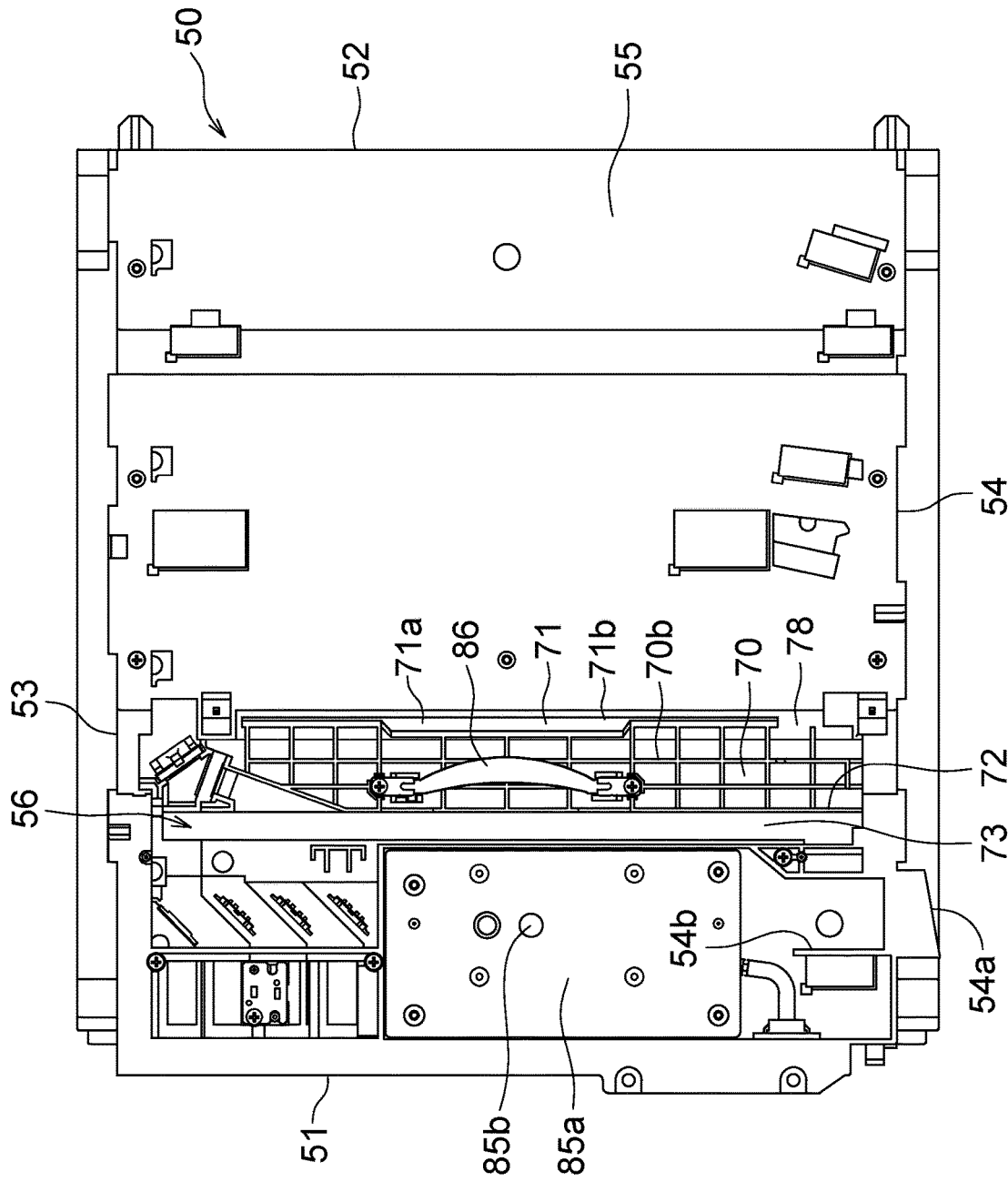
FIG. 7 is an external plan view illustrating a state where the lower housing from which the upper housing and the bottom plate member are removed is viewed from below.
Figure 8:
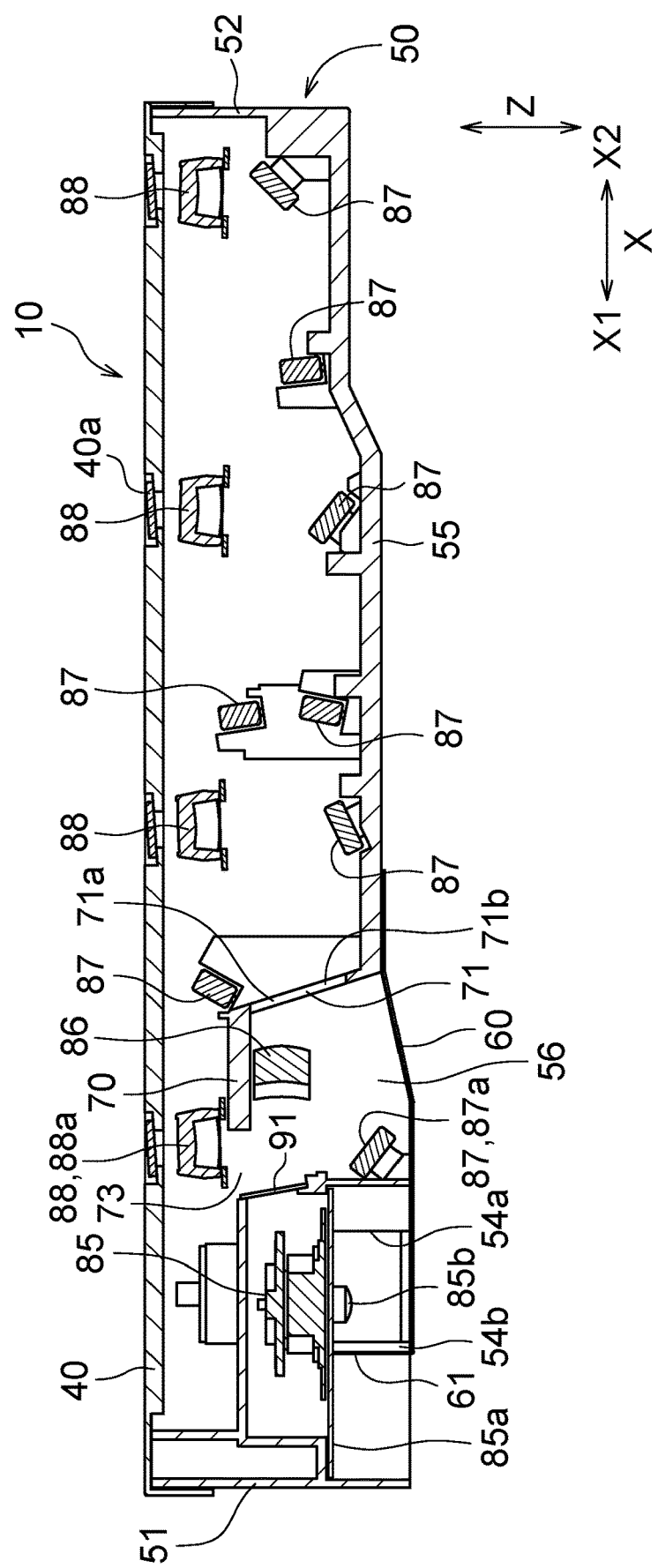
FIG. 8 is a schematic cross-sectional view illustrating an internal structure of the optical scanning device.

FIG. 4 is an external perspective view illustrating a state where the lower housing 50 from which the upper housing 40 is removed is viewed from above, FIG. 5 is an external perspective view illustrating a state where the lower housing 50 from which the bottom plate member 60 is removed is viewed from above, FIG. 6 is an external plan view illustrating a state where the lower housing 50 from which the upper housing 40 and the bottom plate member 60 are removed is viewed from above, FIG. 7 is an external plan view illustrating a state where the lower housing 50 from which the upper housing 40 and the bottom plate member 60 are removed is viewed from below, and FIG. 8 is a schematic cross-sectional view illustrating an internal structure of the optical scanning device 10. In consideration of readability of the drawings, FIG. 6 and FIG. 7 illustrate a state where some reflection mirrors 87 and emission lenses 88 provided in the vicinity of a raised area 70 are removed.

A light source 81, a pre-deflection primary reflection mirror 82, a pre-deflection secondary reflection mirror 83, a cylindrical lens 84, a rotating polygon mirror 85, an fθ lens 86, a reflection mirror 87, and an emission lens 88 are mounted in the lower housing 50.

The light source 81 is mounted to the lower housing first side wall 51 and is arranged at a portion near the lower housing third side wall 53. The pre-deflection primary reflection mirror 82 is provided at a position being opposite to the light source 81 in the sub scanning direction X, and guides a beam emitted from the light source 81 toward the pre-deflection secondary reflection mirror 83.

In the present embodiment, the light source 81 includes four light sources 81 provided corresponding to the four photosensitive drums 13, and beams emitted from the light sources 81 enter the respectively corresponding photosensitive drums 13. The four light sources 81 are arranged so that positions in a height direction Z are different from one another, the pre-deflection primary reflection mirror 82 includes the four pre-deflection primary reflection mirrors 82 at heights corresponding to the four light sources 81, and the heights of the pre-deflection primary reflection mirrors 82 are adjusted so that some of the beams pass above the pre-deflection primary deflection mirrors 82. Positions of the light sources 81 and the pre-deflection primary reflection mirrors 82 with respect to the pre-deflection secondary reflection mirrors 83 may be appropriately adjusted, and it may suffice that the light sources 81 and the pre-deflection primary reflection mirrors 82 are arranged so that the beams emitted from the plurality of light sources 81 enter one pre-deflection secondary reflection mirror 83 and that the number of the pre-deflection primary reflection mirrors 82 may be changed.

The pre-deflection secondary reflection mirror 83 guides a reflected beam to enter the rotating polygon mirror 85 through the cylindrical lens 84. A structure for mounting the pre-deflection secondary reflection mirror 83 and the cylindrical lens 84 will be described with reference to FIG. 9 and FIG. 10 described later.

The rotating polygon mirror 85 is, for example, a polygon mirror including six surfaces (see FIG. 12 for detail), includes a rotation shaft rotated by a drive device such as a motor, and reflects, while rotating, an incident beam so that the incident beam scans the surface of the photosensitive drum 13. The rotating polygon mirror 85 is provided at a position along the lower housing first side wall 51, and is located at a substantially center in the main scanning direction Y of the lower housing 50. A bottom surface of the rotating polygon mirror 85 is covered with a supporting flat plate 85a, and a bearing 85b including a rotation shaft projects downward from the supporting flat plate 85a. The lower housing bottom surface 55 is provided with projections and depressions to nicely accommodate the rotating polygon mirror 85, and a portion through which the beam passes is provided with a transparent dustproof glass 91.

The fθ lens 86 is mounted to face a bottom of the raised area 70 raised upward from the lower housing bottom surface 55. In the lower housing 50, the raised area 70 is provided near the lower housing first side wall 51 in the sub scanning direction X, and ends of the raised area 70 in the main scanning direction Y are connected to the lower housing third side wall 53 and the lower housing fourth side wall 54. In the lower housing 50, the fθ lens 86 is located at a substantially center position in the main scanning direction Y, is provided at a position being opposite to the rotating polygon mirror 85 in the sub scanning direction X, and receives the beam emitted from the rotating polygon mirror 85. A structure in the vicinity of the raised area 70 will be described with reference to FIG. 9 and FIG. 10 described later.

In the present embodiment, the reflection mirrors 87 includes the eight reflection mirrors 87 appropriately arranged at components of the lower housing 50. Any one of the beams emitted from the four light sources 81 is incident on each of the reflection mirrors 87 to be guided to enter the corresponding emission lens 88. In the present embodiment, the emission lens 88 includes the four emission lenses 88, each of which is provided at a position facing the emission window 40*a*. The number of the reflection mirrors 87 corresponding to one beam may be changed as appropriate, and a configuration may be such that the beam is reflected at least two times.

The lower housing 50 is provided with a duct 54*a* opening to outside, and the duct 54*a* formed in a rectangular cylindrical shape extends to outside from an area closer to the lower housing first side wall 51 out of the lower housing fourth side wall 54. The duct 54*a* is connected with a pipe including a fan and the like provided outside the optical scanning device 10 to circulate air through the duct 54*a*.

A duct extension 54*b* extending along a side wall of the duct 54*a* is provided on the bottom surface of the lower housing bottom surface 55. The above-described bottom plate member 60 is formed in a substantially planar shape along the bottom surface of the lower housing 50, and a part of an end of the bottom plate member 60 is bent upward to provide a flow path constituent component 61. As illustrated in FIG. 3, when the bottom plate member 60 is mounted to the lower housing 50, the flow path constituent component 61 is located along the duct extension 54*b*, and the flow path constituent component 61 is configured to extend the duct extension 54*b*. The rotation shaft of the rotating polygon mirror 85 is located at a position along the flow path constituent component 61, and a lower part of the rotation shaft is covered by the bottom plate member 60. That is, when the lower housing 50 and the bottom plate member 60 are combined, a heat radiation channel connected to the duct 54*a* is extended, and the rotation shaft faces the heat radiation channel. Specifically, the rotation shaft of the rotating polygon mirror 85 is supported by the bearing 85*b*, and the bearing 85*b* including the rotation shaft is located inside the heat radiation channel. As a result, an air flow for cooling the rotation shaft of the rotating polygon mirror 85 is formed. At this time, the rotation shaft that easily generates heat as a result of an operation of the rotation shaft is cooled by providing the heat radiation channel, and thus, it is possible to further release the heat.

The lower housing 50 includes the bottom surface opening 56 in which a portion being opposite to the raised area 70 is opened. That is, the lower housing bottom surface 55 is generally provided along a lower end of the side wall, and is interrupted at the bottom surface opening 56. The portion interrupted by the bottom surface opening 56 is covered with the bottom plate member 60. A beam emitted from the rotating polygon mirror 85 passes through the fθ lens 86 provided at a position overlapping the raised area 70, advances in the second sub scanning direction X2, and enters the reflection mirror 87. Therefore, the bottom surface opening 56 is located between the rotating polygon mirror 85 and the reflection mirror 87.

Figure 9:
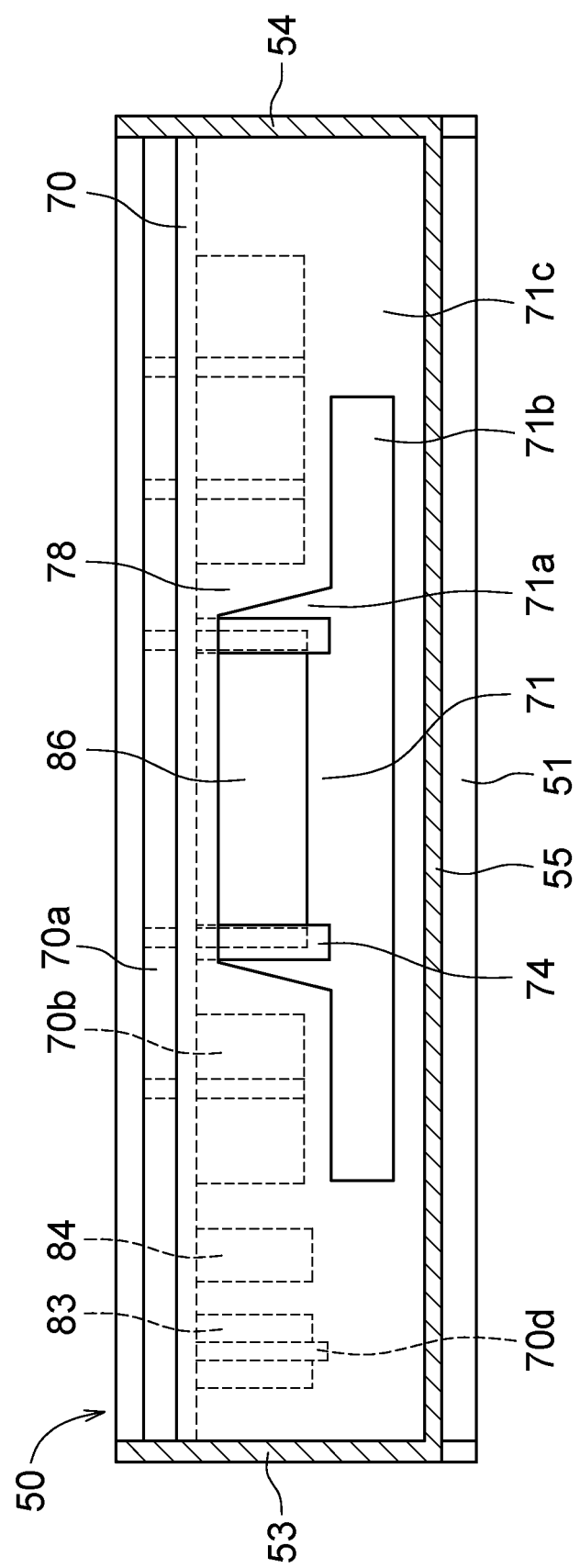
FIG. 9 is a schematic cross-sectional view of a vicinity of a raised area viewed from an emission side of an fθ lens.
Figure 10:
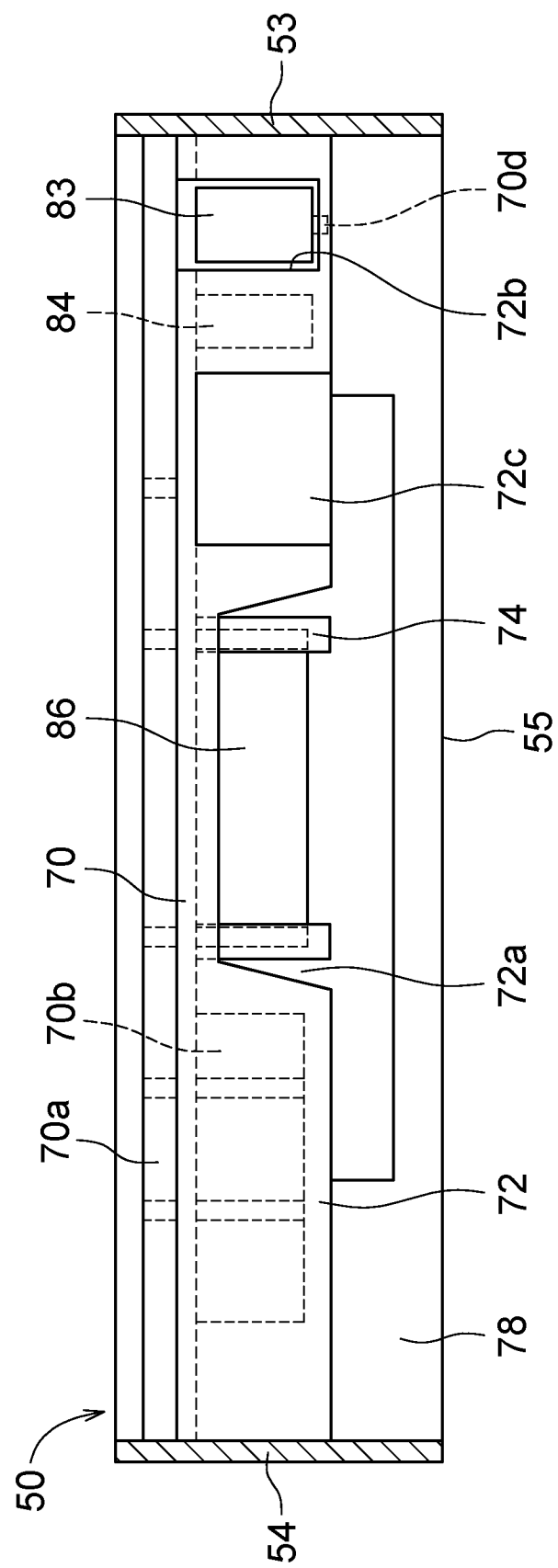
FIG. 10 is a schematic cross-sectional view of the vicinity of the raised area viewed from an incident side of the fθ lens.

FIG. 9 is a schematic cross-sectional view of a vicinity of the raised area 70 viewed from an emission side of the fθ lens 86, and FIG. 10 is a schematic cross-sectional view of the vicinity of the raised area 70 viewed from an incidence side of the fθ lens 86.

Similarly to FIG. 7 and FIG. 8, FIG. 9 and FIG. 10 illustrate a state where some components are removed. In the raised area 70, a lower end of a coupler 78 extending from an end on a side in the second sub scanning direction X2 is coupled to the lower housing bottom surface 55, and the raised area 70 includes an incident-side wall surface 72 extending downward from an end on a side in the first sub scanning direction X1. A lower end of the incident-side wall surface 72 does not reach the lower housing bottom surface 55, and is not connected to the lower housing bottom surface 55. The raised area 70 includes a holder 74 extending downward, and the holder 74 holds a lower part of the fθ lens 86. Thus, a strength of the housing can be further increased by providing the coupler 78 coupling the lower housing bottom surface 55 and the raised area 70 as described above. A detailed structure of the holder 74 will be described with reference to FIG. 11.

The pre-deflection secondary reflection mirror 83 and the cylindrical lens 84 (an example of an optical component) are mounted at a position near the lower housing third side wall 53 below the raised area 70. Specifically, the raised area 70 is provided with a component fixer 70*d* extending downward. The component fixer 70*d* has a claw-shaped distal end, and the lower end of the pre-deflection secondary reflection mirror 83 is hooked on the claw-shaped distal end. The pre-deflection secondary reflection mirror 83 may not only be held by the component fixer 70*d* but also adhere to the raised area 70 and the component fixer 70*d*. In the present embodiment, the cylindrical lens 84 is located in the vicinity of the pre-deflection secondary reflection mirror 83, and is structured to be inserted from above into a recess provided in the raised area 70. However, the present invention is not limited to this, and configuration may be employed in which a component fixer 70*d* that holds the cylindrical lens 84 is further provided to fix the cylindrical lens 84 below the raised area 70. Thus, when another optical component of the fθ lens 86 is mounted to the raised area 70, it is possible to improve a degree of freedom in arranging the components in the housing and to save a space.

A top surface rib 70*a* is provided on a top surface of the raised area 70 and a bottom surface rib 70*b* is provided on a bottom surface thereof. Thus, when the rib is formed on the surface of the raised area 70, a strength in the vicinity of the raised area 70 is secured. The top surface rib 70*a* and the bottom surface rib 70*b* may be formed in an appropriate shape according to a size of the raised area 70, and for example, the top surface rib 70*a* and the bottom surface rib 70*b* are formed linearly from the lower housing third side wall 53 to the lower housing fourth side wall 54. Further, the top surface rib 70*a* and the bottom surface rib 70*b* may include a plurality of the top surface ribs 70*a* and the bottom surface ribs 70*b* and may include a portion for coupling each other. The bottom surface rib 70*b* is provided to avoid components mounted below the raised area 70, and is formed not to obstruct passage of the beam. A length by which the bottom surface rib 70*b* downwardly extends is roughly the same as that of the fθ lens 86, a large space is provided below the fθ lens 86, and the strength of the lower housing 50 in the vicinity of the raised area 70 is increased.

The coupler 78 is formed with a coupling opening 71 that is partially opened in the main scanning direction Y. The coupling opening 71 is configured by an upper coupling opening 71*a* provided at a portion being opposite to the fθ lens 86 and a lower coupling opening 71*b* located below the upper coupling opening 71*a*. In the upper coupling opening 71*a*, a width in the main scanning direction Y is slightly larger than the fθ lens 86, and in the lower coupling opening 71*b*, a width in the main scanning direction Y is formed to be larger than the upper coupling opening 71*a*. The widths of the upper coupling opening 71*a* and the lower coupling opening 71*b* are set in accordance with a spread of the beam to be passed, and a relationship between the irradiation direction of the beam and the spread will be described with reference to FIG. 12 described later.

The incident-side wall surface 72, which is partially opened, includes a wall surface opening 72a, a mirror incident port 72b, and a lens emission port 72c. The wall surface opening 72a is provided at a portion being opposite to the fθ lens 86 in much the same way as the upper coupling opening 71a. The mirror incident port 72b is provided at a portion being opposite to the pre-deflection secondary reflection mirror 83, and passes a beam traveling from the pre-deflection primary reflection mirror 82 toward the pre-deflection secondary reflection mirror 83. The lens emission port 72c is provided on a straight line connecting the cylindrical lens 84 and the rotating polygon mirror 85, and passes a beam traveling from the pre-deflection secondary reflection mirror 83 toward the rotating polygon mirror 85.

As described above, the downwardly extending length of the incident-side wall surface 72 is roughly the same as that of the fθ lens 86, and the incident-side wall surface 72 has an opened shape below the incident-side wall surface 72. That is, in the incident-side wall surface 72, the portion being opposite to the lower coupling opening 71b is opened more widely, in the main scanning direction Y, than the lower coupling opening 71b. As illustrated in FIG. 8, the incident-side wall surface 72 is not connected to the lower housing bottom surface 55 on a side of the rotating polygon mirror 85 in the sub scanning direction X, and a folded opening 73 opened in a height direction Z is provided between the incident-side wall surface 72 and the rotating polygon mirror 85.

As illustrated in FIG. 8 described above, any one of the plurality of reflection mirrors 87 (an opening reflection mirror 87a) is located above the bottom surface opening 56 and below the folded opening 73. The emission lens 88 (an opening emission lens 88a) corresponding to the opening reflection mirror 87a is opposite to the opening reflection mirror 87a with the folded opening 73 being interposed therebetween.

In the present embodiment, the coupling opening 71 and the folded opening 73 are at a position overlapping with the bottom surface opening 56 in the sub scanning direction X, and are lead-out openings sandwiching the raised area 70 between the coupling opening 71 and the folded opening 73.

The coupling opening 71 is located between the fθ lens 86 and the reflection mirror 87 on which a beam firstly enters in the sub scanning direction X, and is provided to penetrate from the bottom surface opening 56 to a top surface side of the lower housing 50. As described above, the fθ lens 86 is mounted to the bottom surface of the raised area 70 and is located on a bottom surface side of the lower housing 50. That is, a beam emitted from the fθ lens 86 passes from the bottom surface side of the lower housing 50 through the coupling opening 71 to the top surface side of the lower housing 50 to travel toward the reflection mirror 87.

The folded opening 73 is located between the rotating polygon mirror 85 and the fθ lens 86 in the sub scanning direction X, and is provided to penetrate from the bottom surface opening 56 to the top surface side of the lower housing 50. That is, a beam reflected by the opening reflection mirror 87a passes from the bottom surface side of the lower housing 50 through the folded opening 73 to the top surface side of the lower housing 50 to travel toward the photosensitive drum 13.

Figure 11:
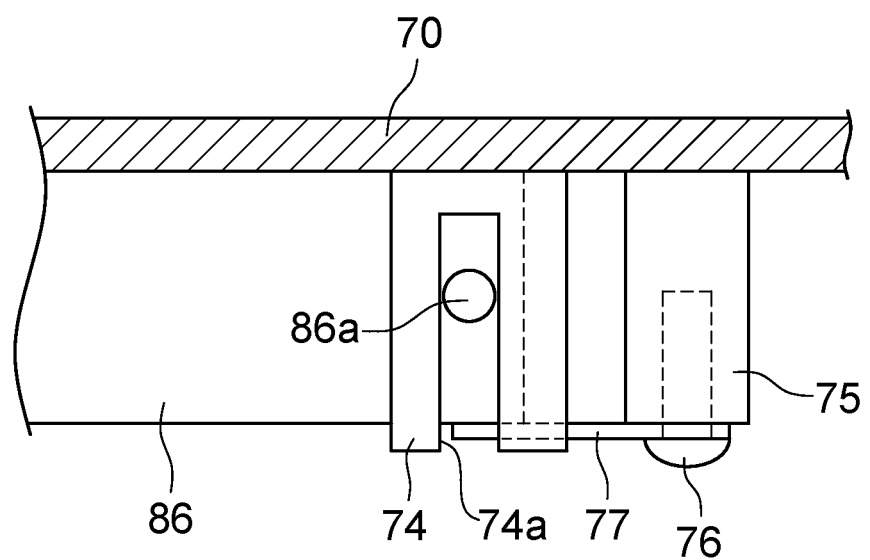
FIG. 11 is an enlarged side view where a holder and its surrounding area are illustrated in an enlarged manner.

FIG. 11 is an enlarged side view where the holder 74 and its surrounding area are illustrated in an enlarged manner.

The holder 74 is provided at a portion overlapping with each of both ends of the fθ lens 86 in the main scanning direction Y. FIG. 11 illustrates, in an enlarged manner, one of the holders 74 provided at two locations. The holder 74 is formed to surround the end of the fθ lens 86, and the fθ lens 86 is inserted from below the holder 74. At one end of the fθ lens 86, a boss 86a protruding from the surface is formed. The holder 74 is formed with a groove 74a extending in the height direction Z, and the boss 86a is inserted along the groove 74a. A width of the groove 74a and a size of the boss 86a are set to be substantially the same, and when the boss 86a is hooked by the groove 74a, the fθ lens 86 is positioned in the main scanning direction Y. Further, the holder 74 is formed to surround an incident side surface and an emission side surface of the fθ lens 86, and thus, when the fθ lens 86 is inserted into the holder 74, the fθ lens 86 is positioned in the sub scanning direction X.

A screw fixer 75 is provided in the vicinity of the holder 74. The screw fixer 75 extends below the raised area 70, and has a hole at a distal end into which a screw 76 is inserted. The screw 76 is mounted to the screw fixer 75 with a plate spring 77 interposed therebetween. The plate spring 77, which has a distal end contacting the lower end of the fθ lens 86, urges the fθ lens 86 to push the fθ lens 86 upward. That is, the fθ lens 86 is pressed by the plate spring 77 to contact a rib (projection: not illustrated) provided on the bottom surface of the raised area 70, and as a result, the fθ lens 86 is positioned in a height direction Z. The holder 74 may be provided with a recess at a portion facing the plate spring 77 so that the plate spring 77 is fitted into the recess to suppress the holder 74 from rattling. In the present embodiment, the plate spring 77 and the screw 76 are employed to realize a structure for holding the fθ lens 86 without complicated processing such as providing a fastening portion and the like to the fθ lens 86. Further, FIG. 11 illustrates the flat plate spring 77, but the present invention is not limited thereto, and irregularities may be provided at a distal end of the plate spring 77 to reduce an area in contact with the fθ lens 86.

Figure 12:
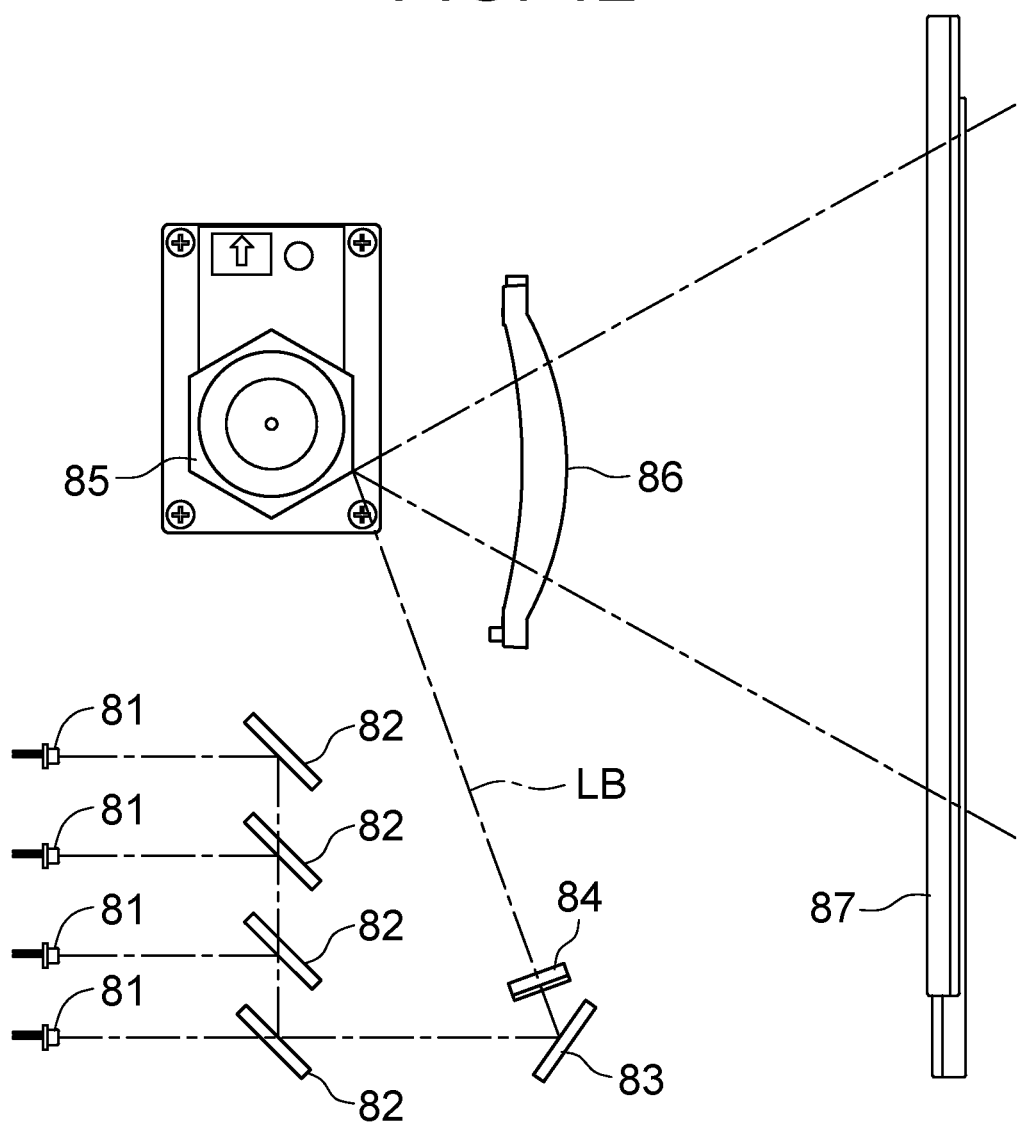
FIG. 12 is an explanatory plan view illustrating an optical path of a beam in the optical scanning device.

FIG. 12 is an explanatory plan view illustrating an optical path of a beam in the optical scanning device 10, and FIG. 13 is an explanatory side view illustrating the optical path of a beam in the optical scanning device 10. In FIG. 12 and FIG. 13, some of the optical components in the optical scanning device 10 are focused for illustration in consideration of the readability of the drawings. In FIG. 13, an optical path of a beam LB emitted from one light source 81 from among beams LB emitted from the four light sources 81 will be described in detail.

As described above, in the optical scanning device 10, the beam LB is emitted from the light source 81. Scanning is performed with the beam LB reflected by the rotating polygon mirror 85 which is rotating, and as a result, an irradiation range in the main scanning direction Y is wider as the beam LB travels along the optical path. That is, when the beam LB passes through the wall surface opening 72a and passes through the fθ lens 86, a distance from the rotating polygon mirror 85 is short, and thus, the irradiation range in the main scanning direction Y is not relatively wide. When the beam LB reaches the reflection mirror 87 into which the beam LB first enters after passing through the upper coupling opening 71a, the irradiation range in the main scanning direction Y is wide. The beam LB passes through the lower coupling opening 71b after being reflected by the reflection mirror 87, passes through the opening reflection mirror 87a, passes through the folded opening 73, and reaches the opening emission lens 88a. At this time, the distance by which the beam LB travels on the optical path is long, and thus, the irradiation range in the main scanning direction Y is wide, so that the widths of the lower coupling opening 71b and the folded opening 73 are desirably wide. That is, in the main scanning direction Y, the width of the coupling opening 71 (particularly, the upper coupling opening 71a) is preferably smaller than the width of the folded opening 73. When the range opened according to the passing beam is narrowed in this way, it is possible to increase the strength of the raised area 70.

The coupling opening 71 is provided, and thus, the optical path of the beam LB is not obstructed. Further, the folded opening 73 is provided to secure the optical path of the beam LB, and the bottom surface opening 56 is provided to utilize an available space, and thus, it is possible to intensively arrange the components to reduce the size of the housing.

In the optical scanning device 10, an emission position of the beam LB is determined according to the photosensitive drum 13, and there is a limit in reducing an interval between the emission windows 40a. Therefore, if a length of the housing is increased in the sub scanning direction X, the optical components are easily arranged in the housing, but at the same time, the size of the device is increased. In the present embodiment, the emission window 40a (emission lens 88) is arranged at a position closer to the rotating polygon mirror 85 relative to the fθ lens 86 in the sub scanning direction X, and thus, the interval with another emission window 40a is secured to shorten the length of the housing.

Further, in the fθ lens 86, if an attachment portion is provided below, the optical path of the beam LB is lowered downward to avoid the attachment portion, and as a result, a thickness of the housing is increased. On the other hand, in the present embodiment, the fθ lens 86 is suspended below the raised area 70, and thus, it is possible to decrease the thickness of the housing while securing the strength of the attachment portion of the fθ lens 86 arranged above.

In the optical scanning device 10, a temperature in the vicinity of the rotating polygon mirror 85 being a driving source tends to increase. If the housing thermally expands, there is a concern that the positions of the held lenses and mirrors are displaced and a position of the emitted beam is deviated. On the other hand, in the present embodiment, the bottom surface opening 56 is provided in the lower housing bottom surface 55 and a part thereof is interrupted, and thus, it is possible to release the heat generated by operating the rotating polygon mirror 85 and transmitted to the housing to prevent displacement of a scanned position due to thermal expansion. The bottom plate member 60 is mounted to cover the bottom surface opening 56, and thus, it is possible to further enhance a heat dissipation effect while preventing intrusion of dust and the like. That is, the heat is transmitted from a side of the rotating polygon mirror 85 side to the bottom plate member 60 facing the bottom surface opening 56, but the heat can be efficiently radiated from the bottom plate member 60 having a high thermal conductivity.

In addition, the raised area 70 is arranged in a portion interrupted by provision of the bottom surface opening 56, and the fθ lens 86 is mounted to the raised area 70, and thus, a space in the housing can be effectively used.

It should be noted that the embodiment disclosed herein is an example in all respects, and is not construed as a basis for restrictive interpretation. Therefore, the technical scope of the present invention is not interpreted only by the above-described embodiment, but is defined based on the description in the claims. Further, all modifications within the meaning and scope equivalent to the scope of the claims are included.

What is claimed is:

1. An optical scanning device for scanning an object to be scanned with a beam, the optical scanning device comprising:
    a light source that emits a beam;
    a rotating polygon mirror that reflects the beam emitted from the light source;
    an fθ lens on which the beam reflected by the rotating polygon mirror is incident; and
    a reflection mirror that guides the beam emitted from the fθ lens to an object to be scanned, wherein
    a housing is configured by a lower housing including an opened top part and an upper housing that covers the opened top part of the lower housing,
    the lower housing includes a raised area being raised upward from a bottom surface of the lower housing, and
    the fθ lens is mounted to face a lower side of the raised area.

2. The optical scanning device according to claim 1, wherein the lower housing includes a coupler that couples the bottom surface and the raised area.

3. The optical scanning device according to claim 2, wherein
    the coupler is located between the fθ lens and a reflection mirror on which a beam emitted from the fθ lens is first incident, on an optical path of the beam, and
    the beam passes through a coupling opening provided in the coupler.

4. The optical scanning device according to claim 1, wherein
    the raised area includes a holder extending downward, and
    the holder holds a lower part of the fθ lens.

5. The optical scanning device according to claim 4, wherein
    the fθ lens is held on the holder by a plate spring and a screw.

6. The optical scanning device according to claim 1, wherein
    the raised area includes a component fixer extending downward, and
    an optical component arranged on the optical path of the beam is fixed to the component fixer.

7. The optical scanning device according to claim 1, wherein
    the lower housing is provided with lead-out openings at positions overlapping with a bottom surface opening in a sub scanning direction along a beam passing through the fH lens, and on both sides sandwiching the raised area.

8. The optical scanning device according to claim 7, wherein
    one of the lead-out openings is provided between the rotating polygon mirror and the fθ lens to provide a folded opening that guides a beam reflected by the reflection mirror to the object to be scanned.

9. The optical scanning device according to claim 7, wherein
    the other of the lead-out openings is provided between the fθ lens and the reflection mirror to provide a coupling opening that guides a beam passing through the fθ lens to the reflection mirror.

10. The optical scanning device according to claim 9, wherein
    the coupling opening includes an upper coupling opening and a lower coupling opening, and a width of the upper coupling opening is smaller than a width of the lower coupling opening in a main scanning direction in which scanning with a beam is performed by the rotating polygon mirror.

11. An image forming apparatus comprising the optical scanning device according to claim 1.

* * * * *